United States Patent

Yasuda et al.

[11] Patent Number: 5,691,393
[45] Date of Patent: Nov. 25, 1997

[54] VINYL CHLORIDE RESIN COMPOSITION

[75] Inventors: Mitsuo Yasuda, Ebina; Kanji Yuyama, Yokohama, both of Japan

[73] Assignee: Zeon Kasei Co., Ltd., Tokyo, Japan

[21] Appl. No.: 790,232

[22] Filed: Jan. 28, 1997

[30] Foreign Application Priority Data

Jan. 31, 1996 [JP] Japan ................. 8-037556

[51] Int. Cl.$^6$ ................. C08J 9/00
[52] U.S. Cl. ................. 521/134; 521/81; 521/145
[58] Field of Search ................. 521/145, 134, 521/81

[56] References Cited

U.S. PATENT DOCUMENTS

| | | | |
|---|---|---|---|
| 4,211,853 | 7/1980 | Raley, Jr. ................. | 521/134 |
| 4,345,040 | 8/1982 | Hall ................. | 521/145 |
| 4,401,612 | 8/1983 | Nehmey et al. ................. | 521/145 |
| 4,663,362 | 5/1987 | Koebisu et al. ................. | 521/134 |
| 4,701,472 | 10/1987 | Koebisu et al. ................. | 521/134 |
| 4,980,383 | 12/1990 | Shimaza et al. ................. | 521/145 |

*Primary Examiner*—Morton Foelak
*Attorney, Agent, or Firm*—Sherman and Shalloway

[57] ABSTRACT

The present invention provides a vinyl chloride resin composition capable of providing a molded product having a uniform-and-fine-cell structure, a smooth surface and a small linear expansion coefficient. The composition comprises 100 parts by weight of (A) a vinyl chloride resin, 0.5–30 parts by weight of (B) a methacrylic acid ester copolymer resin, 0.5–30 parts by weight of (C) a chlorinated polyethylene resin, 25–60 parts by weight of (D) talc, and (E) a blowing agent.

3 Claims, No Drawings

VINYL CHLORIDE RESIN COMPOSITION

The present invention relates to a vinyl chloride resin composition for cellular molding, having good moldability and capable of forming a cellular molding product having a small linear expansion coefficient and a uniform-cell structure.

Vinyl chloride resins are used in various applications for their good physical and chemical properties. Extrusion cellular molding products as a replacement for wood used as building materials, furnishings, furniture, etc. were materialized by using a combination of an organic blowing agent and an inorganic blowing agent in the presence of a methacrylic acid ester copolymer resin to form uniform fine cells (Japanese Patent Publication No, 9540/1988). The extrusion cellular molding products, however, have had a problem of large linear expansion coefficient; for example, furnishings and doors made therefrom are difficult to open or close when subjected to thermal expansion by rise in atmospheric temperature. In order to obtain a molded product of small linear expansion coefficient, it was attempted to add a fibrous material to a resin and also it was proposed to add talc [Japanese Patent Application Kokai (Laid-Open) No. 146958/1987]. These attempt and proposal achieved reduction in linear expansion coefficient but the extrusion-molded products obtained thereby have had a problem of poor-looking surface because their whole surfaces had a fiber or talc protruded.

Hence, the object of the present invention is to provide a vinyl chloride resin composition capable of providing a molded material having a uniform-and-fine cell internal structure, a smooth surface and a small linear expansion coefficient.

The present inventors made a study in order to solve the above-mentioned problems of the prior art. As a result, the present inventors found out that the above object could be achieved by adding, to a vinyl chloride resin, specific amounts of talc, a methacrylic acid ester copolymer resin and a chlorinated polyethylene resin and subjecting the resulting composition to extrusion cellular molding.

According to the present invention, there are provided:

(1) a vinyl chloride resin composition for cellular molding, comprising 100 parts by weight of (A) a vinyl chloride resin, 0.5–30 parts by weight of (B) a methacrylic acid copolymer type resin, 0.5–30 parts by weight of (C) a chlorinated polyethylene resin, 25–60 parts by weight of (D) talc, and (E) a blowing agent, (2) a vinyl chloride resin composition for cellular molding according to the above (1), wherein the vinyl chloride resin (A) has an average polymerization degree of 400–1,200, and (3) a vinyl chloride resin composition for cellular molding according to the above (1) or (2), wherein the methacrylic acid ester copolymer resin (B) contains methyl methacrylate in an amount of 50% by weight or more and has a specific viscosity of 0.25–1.00 as measured at 25° C. in a solution of 0.1 g of the resin (B) dissolved in 100 ml of chloroform.

The vinyl chloride resin as the component (A) of the present composition includes a vinyl chloride homopolymer and a copolymer between vinyl chloride (a major component) and a monomer copolymerizable therewith. Such a comonomer includes vinyl esters such as vinyl acetate, vinyl propionate and the like; vinyl ethers such as ethyl vinyl ether, cetyl vinyl ether and the like; (meth)acrylic acid and derivatives thereof, such as acrylic acid, methacrylic acid, ethyl acrylate, methyl methacrylate, 2-hydroxypropyl methacrylate and the like; unsaturated dibasic acids and derivatives thereof, such as maleic acid, fumaric acid, monomethyl maleate and the like; aromatic vinyl compounds such as styrene, α-methylstyrene and the like; vinyl cyanide compounds such as acrylonitrile, methacrylonitrile and the like; vinylidene compounds such as vinylidene chloride, vinylidene bromide and the like; α-olefins such as propylene and the like; and so forth. These comonomers can be used in a single compound or a combination of two or more compounds.

The average polymerization degree of the vinyl chloride resin (A) is preferably 400–1,200, more preferably 600–1,000 as measured by JIS K 6721. When the average polymerization degree is smaller than 400, the resulting composition tends to have a low expansion ratio. When the average polymerization degree is larger than 1,200, there is a fear that the resulting composition gives a cellular product in which cells are broken (open cells are formed) and cell sizes are nonuniform.

The methacrylic acid ester copolymer resin, which is the component (B) of the present composition, is preferably a methyl methacrylate homopolymer or a copolymer between methyl methacrylate and at least one monomer copolymerizable therewith. The comonomer includes ethyl acrylate, butyl acrylate, ethoxyethyl acrylate, 2-ethylhexyl methacrylate, 2-hydroxypropyl methacrylate, acrylonitrile, vinyl acetate, etc. The copolymer preferably contains methyl methacrylate in an amount of 50% by weight or more, particularly 80% by weight or more. The methacrylic acid ester copolymer resin (B) can be a granular methacrylic acid ester copolymer resin disclosed in Japanese Patent Publication No. 38014/1993, for example, a granular resin of core/shell structure consisting of a core made of a methyl methacrylate-acrylic acid ester copolymer and a shell made of a methyl methacrylate homopolymer or a copolymer composed mainly of methyl methacrylate.

The methacrylic acid ester copolymer resin used as the component (B) has a specific viscosity of preferably 0.25–1.00, more preferably 0.30–0.90 as measured at 25° C. in a solution of 0.1 g of the polymer (B) dissolved in 100 ml of chloroform. When the specific viscosity is less than 0.30, the resulting cellular molding product tends to have a rough surface; when the specific viscosity is more than 1.00, a long time may be needed for uniform melting of the composition.

The methacrylic acid ester copolymer resin (B) has an action of improving the melt viscosity property of the vinyl chloride resin (A) and allowing the cell walls of a cellular product to have a sufficient strength so that the cells are not broken easily.

The amount of the component (B) used is 0.5–30 parts by weight, preferably 1–20 parts by weight per 100 parts by weight of the vinyl chloride resin (A). When the amount is less than 0.5 part by weight, the cell walls of a cellular product have a low strength and the cells are broken easily. When the amount is more than 30 parts by weight, the melt viscosity of the composition is high, resulting in high heat generation and easy thermal degradation of the resins, and the cells of a cellular product tend to have non-uniform sizes.

The chlorinated polyethylene resin, which is the component (C) of the present composition, is an amorphous resin obtained by chlorinating a polyethylene resin having an ethylene content of 50% by weight or more, and has a chlorine content of preferably 20–50% by weight, more preferably 25–45% by weight. When the chlorine content is less than 20% by weight, the cellular product obtained tends to have large cells; when the chlorine content is more than 45% by weight, the cells tend to be broken and the cellular molding product obtained tends to have sink marks. The Mooney viscosity ($MS_{1+4}$ 100° C.) of the chlorinated polyethylene resin (C) is preferably 60–90, more preferably 65–85. When the Mooney viscosity is smaller than 60 or larger than 90, the mixing of the chlorinated polyethylene resin (C) with the vinyl chloride resin (A) and the methacrylic acid ester copolymer resin (B) tends to become nonuniform. The chlorinated polyethylene resin (C) has an action of preventing projection of talc from the surface of a cellular molding product and dispersing talc uniformly in the molded product and further of allowing the resulting composition to have improved processability (e.g. reduced torque).

The amount of the chlorinated polyethylene resin (C) used is 0.5–30 parts by weight, preferably 3–10 parts by weight per 100 parts by weight of the vinyl chloride resin (A). When the amount is less than 0.5 part by weight, the surface of the cellular molding product obtained tends to be rough owing to the projection of talc therefrom; when the amount is more than 30 parts by weight, the molded product tends to have a large linear expansion coefficient.

The talc, which is the component (D) of the present composition, has ordinally an average particle diameter of generally 0.5–10 μm, preferably 1–7 μm. When the average particle diameter is smaller than 0.5 μm, the cellular molding product obtained tends to have no sufficiently reduced linear expansion coefficient; when the average particle diameter is larger than 10 μm, the molded material may have a rough surface.

The amount of talc (D) used is 25–60 parts by weight, preferably 30–50 parts by weight per 100 parts by weight of the vinyl chloride resin (A). When the amount is less than 25 parts by weight, the cellular molding product obtained has no sufficiently low linear expansion coefficient; when the amount is more than 60 parts by weight, the molded product is low in mechanical properties such as impact resistance, tensile strength and the like.

As the blowing agent which is the component (E) of the present composition, an organic blowing agent of thermal decomposition type is generally used. Examples of such an organic blowing agent are nitroso compounds such as N,N'-dinitrosopentamethylenetetramine, N,N'-dimethyl-N,N'-dinitrosoterephthalamide and the like; azo compounds such as azodicarbonamide, azobisisobutyronitrile and the like; and sulfonyl hydrazides such as benzenesulfonyl hydrazide, p,p'-oxybis(benzenesulfonyl hydrazide), toluenesulfonyl hydrazide, derivatives thereof and the like.

In the present invention, it is possible to use, in combination with the above-mentioned organic blowing agent, an inorganic blowing agent of thermal decomposition type selected from the group consisting of sodium bicarbonate, sodium carbonate, ammonium bicarbonate, ammonium carbonate and the like, to delicately control the cell size and surface condition of a cellular molding product.

The amount of the blowing agent (E) used can be appropriately determined depending upon the kind of blowing agent used and the processing conditions selected.

The composition of the present invention may further comprise as necessary, besides the components (A) to (E), a heat stabilizer, a lubricant, an ultraviolet stabilizer, a pigment, a plasticizer, an antistatic agent, etc. all used in ordinary processing of vinyl chloride resin.

There is no particular restriction as to the method for molding the present composition. However, the present composition is molded ordinarily by extrusion.

The embodiments of the present composition are as follows.

(1) A vinyl chloride resin composition for cellular molding, comprising 100 parts by weight of (A) a vinyl chloride resin, 0.5–30 parts by weight of (B) a methacrylic acid ester copolymer resin, 0.5–30 parts by weight of (C) a chlorinated polyethylene resin, 25–60 parts by weight of (D) talc, and (E) a blowing agent.

(2) A vinyl chloride resin composition for cellular molding according to the above (1), wherein the vinyl chloride resin (A) has an average polymerization degree of 400–1,200.

(3) A vinyl chloride resin composition for cellular molding according to the above (1) or (2), wherein the methacrylic acid ester copolymer resin (B) contains methyl methacrylate in an amount of 50% by weight or more and has a specific viscosity of 0.25–1.00 as measured at 25° C. in a solution of 0.1 g of the resin (B) dissolved in 100 ml of chloroform.

(4) A vinyl chloride resin composition for cellular molding according to any of the above (1) to (3), wherein the chlorine content of the component (C) is 20–50% by weight.

(5) A vinyl chloride resin composition for cellular molding according to any of the above (1) to (4), wherein the amount of the component (B) used is 1–20 parts by weight per 100 parts by weight of the component (A).

(6) A vinyl chloride resin composition for cellular molding according to any of the above (1) to (5), wherein the amount of the component (C) used is 3–10 parts by weight per 100 parts by weight of the component (A).

(7) A vinyl chloride resin composition for cellular molding according to any of the above (1) to (6), wherein the amount of the component (D) used is 30–50 parts by weight per 100 parts by weight of the component (A).

The present invention is hereinafter described by Examples. However, the present invention is not restricted to these Examples. The amounts of individual components used are by weight unless otherwise specified.

In the Examples, properties of each cellular molding product were evaluated or measured as follows.
1) Cell A: Cells are fine and uniform.

B: Broken and large cells are found in some portions.

C: Broken and large cells are found in a large number.
2) Surface

A: The surface of molded product is smooth.

B: The surface of molded product has slight shark skin feeling.

C: The surface of molded product has shark skin feeling.
3) True specific gravity and specific gravity of molded product Measured according to the testing solid plastic in water specified by JIS K 7112.
4) Expansion ratio True specific gravity÷(specific gravity of molded material)
5) Tensile strength and elongation Measured by the method specified by JIS K 7113, using a No. 1 specimen at a tensile speed of 10 mm/min.
6) Bending modulus Measured by the method specified by JIS K 7203.
7) Charpy impact strength Measured by the method specified by JIS K 7111, using a No. 5 specimen (notched). 7111, using a No. 5 specimen (notched).

8) Linear expansion coefficient

Measured by the method specified by JIS K 7197.

Examples 1-2 and Comparative Examples 1-4

The components shown in Table 1, of amounts also shown in Table 1 were uniformly mixed using a Henschel mixer. Each composition obtained was subjected to cellular molding using an extruder under the following conditions. The properties of each molded product obtained are shown in Table 1.

Cylinder diameter 40 mmφ, L/D=22, C·R=2.4

Temperature

Zone 1: 140° C.

Zone 2: 170° C.

Zone 3: 180° C.

Adaptor: 160° C.

Die: 160° C.

Die shape 10 mm×10 mm square die, 38 mm×4 mm belt die

Land length 20 mm

TABLE 1

|  |  | Examples | | Comparative Examples | | | |
|---|---|---|---|---|---|---|---|
|  |  | 1 | 2 | 1 | 2 | 3 | 4 |
| Formulation (parts) | Vinyl chloride resin*1 | 100 | 100 | 100 | 100 | 100 | 100 |
|  | Methacrylic acid ester copolymer resin*2 | 5 | 5 | — | 10 | 5 | 5 |
|  | Chlorinated polyethylene resin*3 | 5 | 5 | 10 | — | 5 | 5 |
|  | Talc*4 | 30 | 40 | 40 | 40 | — | 20 |
|  | Organic foaming agent (thermal decomposition type)*5 | 0.5 | 0.5 | 0.5 | 0.5 | 0.5 | 0.5 |
|  | Lead heat stabilizer*6 | 2.0 | 2.0 | 2.0 | 2.0 | 2.0 | 2.0 |
|  | Lead heat stabilizer*7 | 1.0 | 1.0 | 1.0 | 1.0 | 1.0 | 1.0 |
|  | Lubricant*8 | 0.5 | 0.5 | 0.5 | 0.5 | 0.5 | 0.5 |
| Properties of molded material | True specific gravity | 1.52 | 1.52 | 1.57 | 1.57 | 1.36 | 1.47 |
|  | Specific gravity of molded product | 0.66 | 0.72 | 1.01 | 0.65 | 0.45 | 0.69 |
|  | Expansion ratio of molded product | 2.30 | 2.18 | 1.57 | 2.42 | 3.02 | 2.13 |
|  | Tensile strength (kgf/m$^2$) | 156 | 150 | 145 | 160 | 155 | 175 |
|  | Elongation (%) | 12 | 11 | 15 | 10 | 15 | 15 |
|  | Bending modulus (×10$^4$/kgf/cm$^2$) | 2.72 | 2.65 | 1.90 | 2.20 | 1.50 | 1.78 |
|  | Charpy impact strength (kgfcm/cm$^2$) | 4.1 | 3.0 | 5.5 | 3.0 | 4.5 | 5.1 |
|  | Linear expansion coefficient (×10$^{-5}$/°C.) | 3.53 | 3.32 | 3.82 | 3.40 | 6.52 | 4.07 |
|  | Cell | A | A | C | B | A | A |
|  | Surface | A | A | C | B | A | A |

Notes for Table 1

*1Zeon 103EP7 (a vinyl chloride homopolymer having an average polymerization degree of 680; a product of Nippon Zeon CO., Ltd.)

*2Hiblen B403 (a copolymer containing about 90% by weight of methyl methacrylate, having a specific viscosity of 0.78 as measured at 25° C. in a solution of the copolymer dissolved in 100 ml of chloroform; a product of Nippon Zeon CO., Ltd.)

*3Elaslen 301A [an amorphous chlorinated polyethylene having a chlorine content of 30% by weight and a Mooney viscosity (MS$_{1+4}$ 100° C.) of 70; a product of Showa Denko K.K.]

*4Talc MS (a product of Nippon Talc CO., Ltd. having an average particle diameter of 6 μm)

*5Vinyfor AC NO. 3 (a product of Eiwa Chemical Ind., CO., Ltd. having a decomposition temperature of 208° C.)

*6Stabinex TC (Tribasic lead sulphate produced by Mizusawa Industrial Chemicals, Ltd.)

*7Stabinex NC18 (lead stearate produced by Mizusawa Industrial Chemicals, Ltd.)

*8Hiwax 200P (a wax produced by Mitsui Toatsu Chemicals, Inc.)

The following matters are clear from the results of Table 1.

The molded products obtained in Examples 1 and 2, obtained from compositions satisfying the requirements of the present invention had a sufficiently small linear expansion coefficient, uniform and fine cells and a smooth surface. Moreover, they showed satisfactory values in expansion ratio, tensile strength, elongation, bending modulus and impact strength.

The molded products obtained in Comparative Examples 1 and 2, obtained from compositions comprising no methacrylic acid ester copolymer resin or chlorinated polyethylene resin had broken cells and a shark skin surface.

The molded products obtained in Comparative Example 3, obtained from a composition comprising no talc had a large linear expansion coefficient. Further, as seen in Comparative Example 4, a molded product comprising talc in an amount smaller than specified in the present invention was not sufficiently reduced in linear expansion coefficient.

What is claimed is:

1. A vinyl chloride resin composition, comprising 100 parts by weight of (A) a vinyl chloride resin, 0.5–30 parts by weight of (B) a methacrylic acid ester copolymer resin, 0.5–30 parts by weight of (C) a chlorinated polyethylene resin, 25–60 parts by weight of (D) talc, and (E) a blowing agent.

2. A vinyl chloride resin composition according to claim 1, wherein the vinyl chloride resin (A) has an average polymerization degree of 400–1,200.

3. A vinyl chloride resin composition according to claim 1 or 2, wherein the methacrylic acid ester copolymer resin (B) contains methyl methacrylate in an amount of 50% by weight or more and has a specific viscosity of 0.25–1.00 as measured at 25° C. in a solution of 0.1 g of the resin (B) dissolved in 100 ml of chloroform.

* * * * *